United States Patent [19]

Miyatake et al.

[11] Patent Number: 5,083,860
[45] Date of Patent: Jan. 28, 1992

[54] METHOD FOR DETECTING CHANGE POINTS IN MOTION PICTURE IMAGES

[75] Inventors: Takafumi Miyatake, Hachioji; Satoshi Yoshizawa, Kawasaki; Hirotada Ueda, Kokubunji, all of Japan

[73] Assignee: Institut for Personalized Information Environment, Tokyo, Japan

[21] Appl. No.: 667,647

[22] Filed: Mar. 11, 1991

[30] Foreign Application Priority Data

Aug. 31, 1990 [JP] Japan .................................. 2-230930

[51] Int. Cl.⁵ .............................................. G03B 21/00
[52] U.S. Cl. .................................... 352/129; 352/38; 352/87
[58] Field of Search ................... 352/129, 38, 87, 50, 352/85, 44, 46

[56] References Cited

U.S. PATENT DOCUMENTS

| | | | |
|---|---|---|---|
| 4,501,478 | 2/1985 | Mattes | 352/129 |
| 4,606,625 | 8/1986 | Geshwind | 352/85 |
| 4,980,762 | 12/1990 | Heeger et al. | 352/44 |

Primary Examiner—Monroe H. Hayes
Attorney, Agent, or Firm—Antonelli, Terry, Stout & Kraus

[57] ABSTRACT

There is provided a method for detecting change points between cuts from motion picture images including a plurality of consecutive images. First of all, in this method, motion picture images which are the subject of detection of change point between cuts are inputted in a time series by taking a frame as the unit, and a predetermined feature quantity including a color histogram possessed by image data of said motion picture images is produced while taking a frame as the unit. A correlation coefficient with respect to feature quantity between the above described feature quantity and a feature quantity produced in an immediately preceding frame is then produced. Further, a change rate between the correlation coefficient of the current frame and a correlation coefficient produced for a frame preceding the current frame is produced. A time point whereat the change rate exceeds a predetermined allowable value is detected as a change point between cuts of the motion picture images.

6 Claims, 11 Drawing Sheets

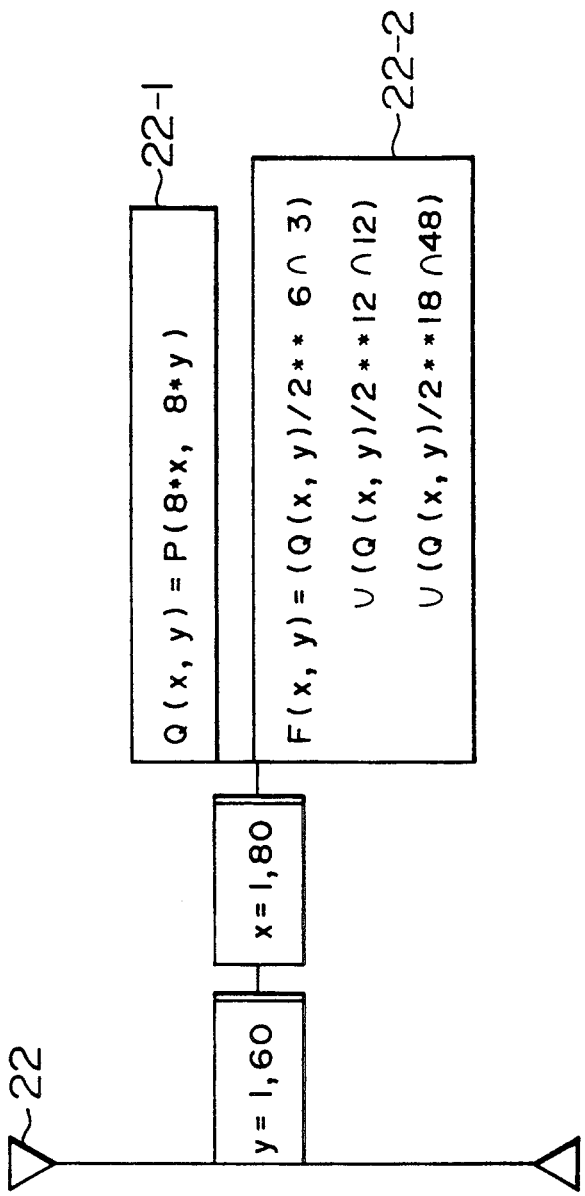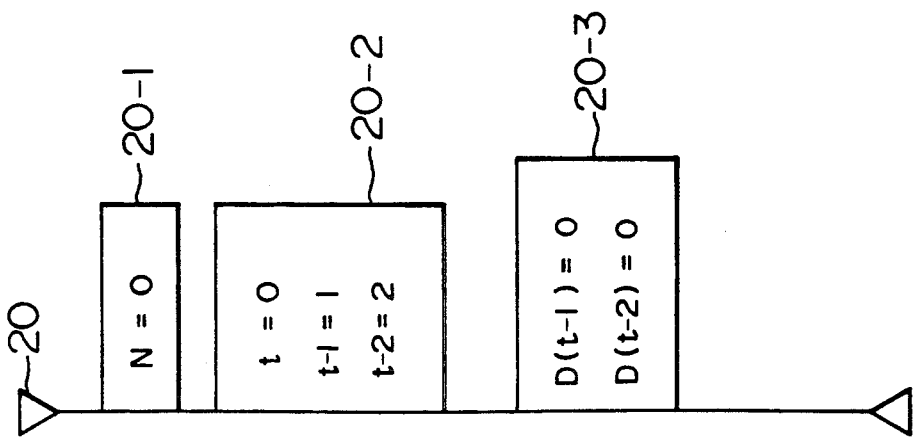

1: CHANGE
0: SAME

METHOD FOR DETECTING CHANGE POINTS IN MOTION PICTURE IMAGES

BACKGROUND OF THE INVENTION

The present invention relates to a motion picture image editing method capable of searching for the starting point of motion picture images included in videotapes and/or movie film signals separately for individual scenes (hereafter referred to as cuts), and in particular to a picture image change point detecting method for detecting a change point between cuts from motion picture images stored in video tape or a video disk.

As a treatise concerning a method for automatically detecting motion picture image cuts, "Study on motion picture image data base handling" by Sotomura and Abe, Technical Report IE89-6, 89-33, The Institute of Electronics, Information Communication Engineers (IEICE), for example, can be mentioned. This treatise has proposed a method of detecting pictorial image change points visually by defining "motion picture image cut" as a section of picture images in which the picture images largely change and by using brightness. That is to say, histogram of brightness is extracted as a feature quantity for each frame of a subject motion picture image, and then a histogram difference between a frame at the pertinent current time point and its immediately preceding frame is derived. The sum total of resultant difference values is calculated. The sum total of difference values is used as the frame correlation coefficient, and a certain fixed threshold is set. When the correlation coefficient exceeds this threshold value, it is determined that a change point between cuts has appeared. A "cut" means a section of picture images forming one scene lasting from the beginning of a certain operation to the end thereof in motion picture images such as video signals and picture image signals.

SUMMARY OF THE INVENTION

However, the above described method uses the difference of brightness histogram of the whole screen of each frame as the correlation coefficient. If the difference of brightness histogram is thus used to detect picture image change points, detection sensitivity is insufficient. This will now be described. It is now assumed that the correlation coefficient has a small value although the picture image changes completely. For example, the difference value of brightness histogram characteristic between a picture having a white left half and a black right half as shown in FIG. 15A and a picture having a black left half and a white right half as shown in FIG. 15B becomes 0 in this case as evident from characteristics shown in brightness histogram characteristic diagrams FIGS. 16A and 16B respectively corresponding to FIGS. 15A and 15B. Therefore, the correlation coefficient also becomes 0. Even if there are changes in individual places of a picture, it is determined that there is little change in the histogram provided that changes of their total values are the same.

From these facts, it is considered that the detection sensitivity has been deteriorated as a result of mutual interference between brightness feature quantities of picture image areas included in one frame.

Further, in case this correlation coefficient is used for detecting cuts of picture images moving violently, individual correlation coefficients assume large values in succession every frame of picture images and hence false detection of motion picture image cuts occurs frequently in contrast with the case described before. In picture images obtained by zooming-in a sports player moving violently, for example, picture image changes continue constantly. Therefore, a change point between cuts occurs every frame, correct cut detection becoming difficult.

A change point between cuts is not always present even between frames having rapidly changing picture images. Hence, it follows that it is a necessary condition but not sufficient condition to detect a frame having a rapidly changing picture image as compared with receding and succeeding frames.

An object of the present invention is to provide a motion picture image change point detecting method capable of settling the above described problems of the prior art, preventing false detection in case of consecutive frames having violent motions, and detecting at high speed correct change points of motion picture images even in an ordinary work station without lowering the detection sensitivity.

In order to achieve the above described object, a motion picture image change point detecting method according to the present invention has a feature (i) that this method comprises the steps of inputting motion picture images to be processed to a processing unit in a time series by taking a frame as the unit, calculating a feature quantity including a color histogram possessed by that image data by taking a frame as the unit, deriving a correlation coefficient between that feature quantity and a feature quantity calculated in an immediately preceding frame, deriving a change rate between that correlation coefficient and a correlation coefficient derived in a past frame, and determining the time point whereat the change rate exceeds a predetermined allowable value as a change point between cuts of motion picture images. Further, (ii) the motion picture image change point detecting method according to the present invention has a feature that the feature quantity includes a brightness or color histogram of the case where an image is divided into small blocks. Further, (iii) the motion picture image change point detecting method according to the present invention has a feature that feature quantities of corresponding blocks of consecutive preceding and succeeding frames in case picture images are divided into small blocks are compared, blocks largely changed as a result of comparison are counted, and the number of counted blocks normalized by the number of blocks of the whole image is defined as the correlation coefficient. Further, (iv) the motion picture image change point detecting method according to the present invention has a feature that the change rate is defined as the difference between the correlation value derived in the current frame and a larger one of the correlation value derived in a frame immediately preceding the current frame and the correlation value derived in a frame preceding the current frame by two frames. Further, (v) the motion picture image change point detecting method according to the present invention has a feature that motion picture images to be processed are inputted by taking a frame as the unit and upon determination of a change point between cuts of motion picture images, a time code identifying the determined frame and a picture image of a determined change point between cuts are outputted as index information of that motion picture image cut.

In accordance with the present invention, motion picture images are inputted to a processing unit in time series by taking a frame as the unit, a feature quantity representing the feature of picture image data is calculated every section area (herein referred to as block) included in each frame, and the degree of resemblance between this feature quantity and a feature quantity calculated in an immediately preceding frame is derived every block. The ratio of the number of blocks each having a low degree of resemblance to the number of all blocks is derived as a correlation coefficient. A change rate between this correlation coefficient and a correlation coefficient derived in a past frame is calculated. When this change rate exceeds an allowable value, it is determined that a change point of the motion picture image has appeared. A time code identifying the frame of that time point and a picture image of a change point between cuts are outputted as index information of the motion picture image cut.

In this way, a change is detected for each of individual blocks included in a frame, and the number of changed blocks normalized by the number of all blocks is used as the correlation coefficient for detecting a change point between motion picture image cuts. Therefore, interference of feature quantities between areas can be prevented. In addition, since the correlation coefficient is normalized in the range of 0 to 1, handling in the succeeding processing becomes easy.

Further, in case a change point between motion picture image cuts is to be detected, determination is made on the basis of a change rate with respect to a past correlation coefficient. Even if the value of correlation coefficient is large (i.e., even if the picture image change is large), therefore, the change rate itself is small provided that it continues from the past. Therefore, it is prevented that this is falsely regarded as a cut and detected. That is to say, such a state that a picture image change is large but its change rate is small continues in cuts having violent motions. Therefore, use of the above described method is extremely effective.

BRIEF DESCRIPTION OF THE DRAWINGS

FIG. 3 is a PAD diagram showing details of initialization processing of FIG. 2;

FIG. 4 is a PAD diagram showing the detail procedure of picture image decimation processing of the same FIG. 2;

DESCRIPTION OF THE PREFERRED EMBODIMENT

Embodiments of the present invention will hereafter be described in detail by referring the drawings.

Figure 1:
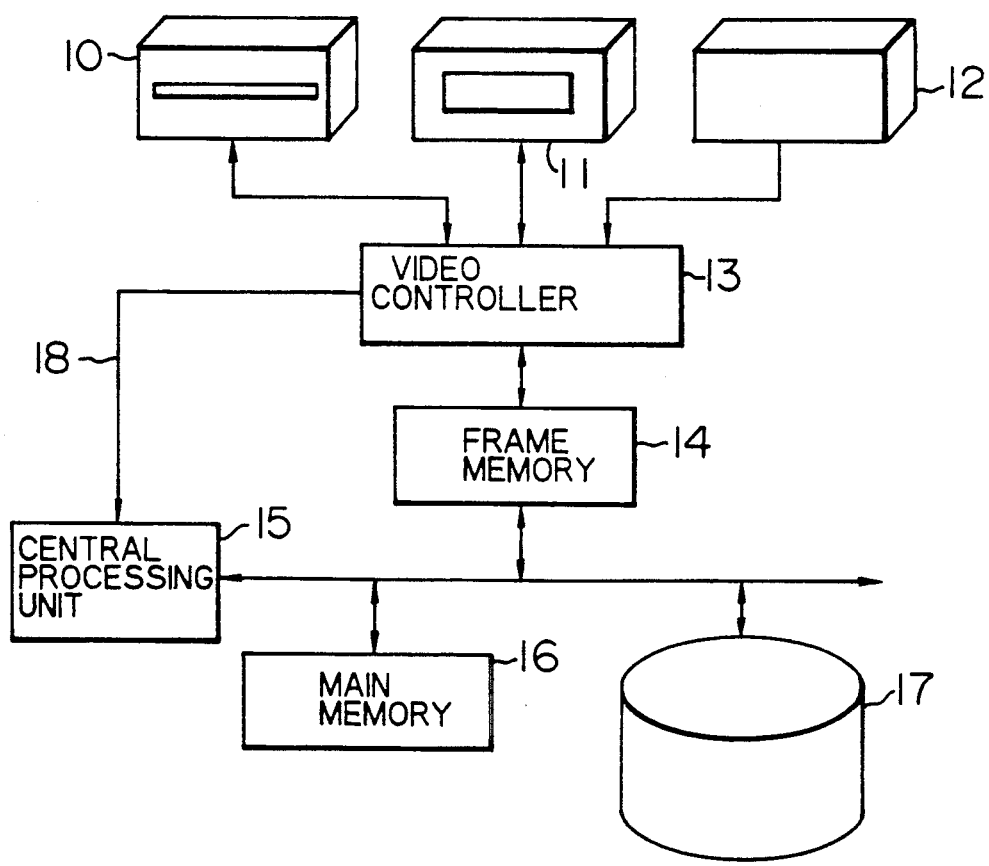
FIG. 1 is a general block diagram of an automatic indexing system of a motion picture image which is an embodiment implementing the present invention method.

FIG. 1 is a general block diagram of an automatic motion picture image indexing system showing an embodiment for implementing the present invention method.

With reference to FIG. 1, numerals 10, 11 and 12 denote input/output devices of motion picture images to be processed. And numerals 10, 11 and 12 denote a video disk device, a video tape recorder and a television tuner, respectively. Further, numeral 13 denotes a video controller for performing control of motion picture image input/output devices and changing inputs. Numeral 14 denotes a frame memory for storing motion picture signals frame by frame, 15 a central processing unit for issuing directions to the video controller 13 to exercise control, 16 a main memory for storing program to be executed by the central processing unit 15 and data to be used, and 17 a magnetic disk device which is an external memory for supplementing the capacity of the main memory 16.

Operational features of motion picture image input/output devices 10, 11 and 12 will now be described. In the video disk device 10, video data are sequentially recorded, but random access is possible. In the video tape recorder 11, video data are sequentially recorded and access is also sequential, but slow reproduction is possible. Further, in the television tuner 12, recording is impossible and images are transmitted (broadcasted) unilaterally from a broadcasting station or the like at a constant speed.

On the basis of a command 18 supplied from the central processing unit 15, the video controller 13 exercises control over various motion picture image input/output devices 10, 11 and 12, and connects one of them as the input source to take in motion picture images and store the motion picture images frame by frame. The central processing unit 15 analyzes motion picture images read out from the frame memory 14, and stores intermediate data thus analyzed into the main memory 16 temporarily. Thereafter, the central processing unit 15 produces a time code identifying a frame at that time point and an image of a change point between cuts as index information of motion picture images and stores them into the magnetic disk device 17. When occasion demands, the central processing unit 15 can also output a write command signal and write a time code indicating a change point between cuts into the video disk device 10 and the video tape recorder 11.

Thus, a system of the present invention does not include special configuration and it can be easily constructed by using AV devices and work station devices.

Figure 2:
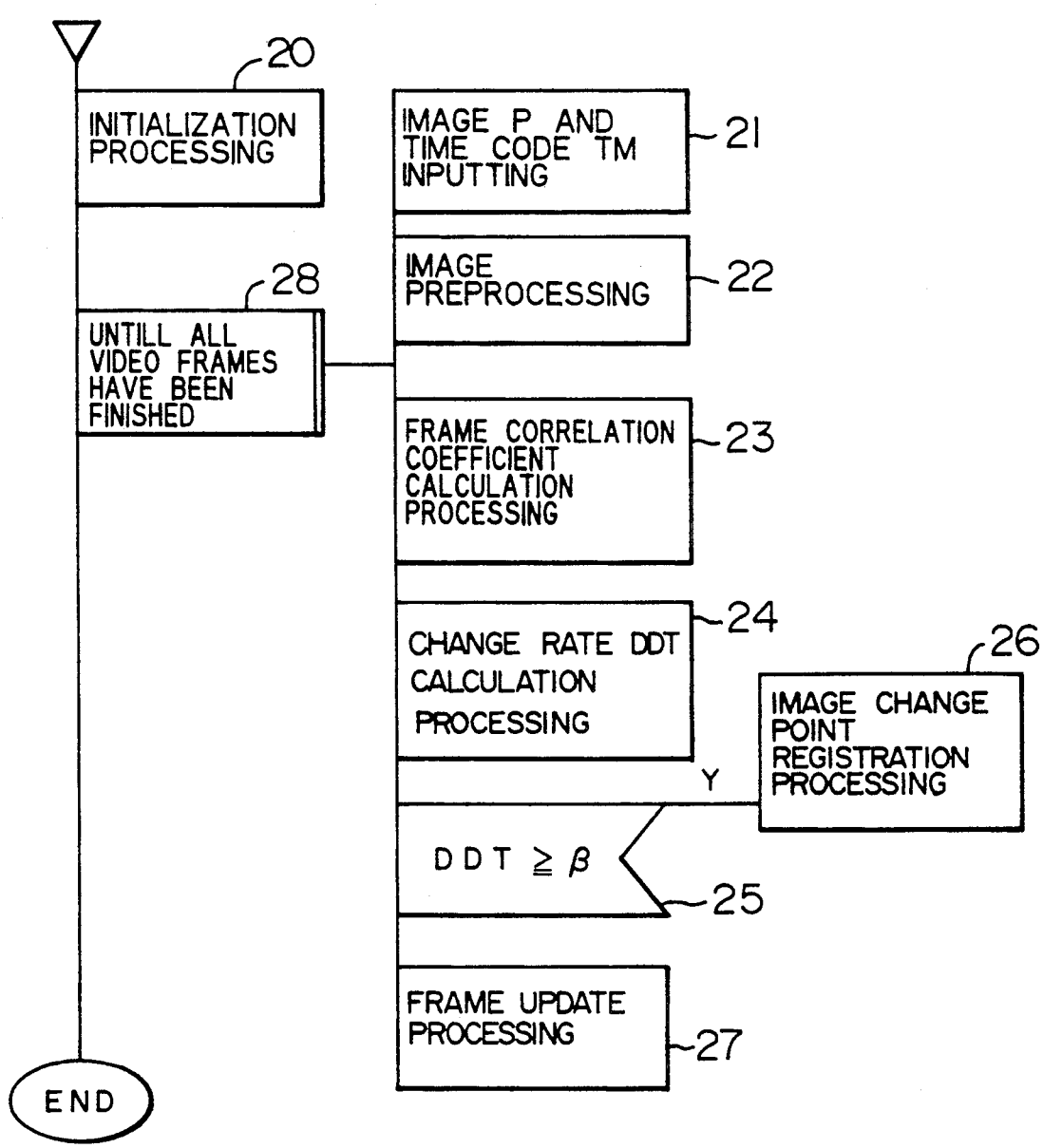
FIG. 2 is a PAD diagram of index information producing processing of motion picture image cuts in the apparatus of FIG. 1.

FIG. 2 is a PAD diagram of index information producing processing performed by the central processing unit of FIG. 1.

The central processing unit 15 detects image change points of motion picture image cuts and thereby produces index information.

First of all, initial values are supplied to various variables in initialization processing (box 20). Details of the initialization processing will be described later by referring to FIG. 3.

In image input processing (box 21), motion picture images are taken into the frame memory 14 by one frame. If in this case the input source is the video disk device 10 or the video tape recorder 11, information corresponding to an address where that frame is stored on a medium is read as the time code and stored into a variable TM.

In image preprocessing (box 22), image decimation and color picture element compression are performed in order to reduce the amount of computation of succeeding processing. Details of image decimation processing will be described later by referring to FIGS. 4 and 5.

In frame correlation coefficient calculation processing (box 23), the frame correlation coefficient is calculated and the result of calculation is stored into arrangement D(t).

As the frame correlation coefficient used in the present invention, the proportion that one frame of a changed area included in a corresponding area between frames accounts for in the whole screen is used. By doing so, the frame correlation coefficient ranges from 0 to 1. If the image completely changes between frames, the frame correlation coefficient becomes 1. If there is no change, the frame correlation coefficient becomes 0. There are various methods for deriving a change area. Simple difference of picture elements results in high sensitivity to noises. Further, in brightness histogram difference of the whole screen of each frame, the detection sensitivity is worsened by interference of brightness between areas as shown in FIGS. 15A and 15B and FIGS. 16A and 16B. In the present embodiment, therefore, the screen is divided into small blocks, a change block in the current frame is derived on the basis of the degree of resemblance of color histogram between corresponding blocks of frames, and the sum total of these change blocks is interpreted as a change area concrete correlation coefficient calculation will be described later by referring to FIG. 7.

In succeeding change rate calculation processing (box 24), the change rate of the correlation coefficient is calculated, and then the result of calculation is stored into a variable DDT. A concrete calculation method of the change rate of the correlation coefficient will be described later in detail by referring to FIG. 10.

In the succeeding decision processing (box 25), a change point between cuts is determined.

That is to say, it is determined that a change between cuts has appeared when $$\frac{dD(t)}{dt} \geq \beta.$$

Here, $\beta$ is a threshold for deciding the change point between cuts. In the present embodiment, $\beta = 0.6$.

In image change point registration processing (box 26), index information of an operation image cut is produced in case it is determined that a change point between cuts has appeared. Details of index information producing processing of the operation image cut will be described later by referring to FIGS. 11 and 12.

In frame update processing (box 27), the frame is updated. Details of this processing will be described later by referring to FIG. 13.

In all video frames decision processing (box 28), it is determined whether there is still a motion picture image to be processed or not. If there is still a motion picture image to be processed, processing is repeated from block 21.

FIG. 3 is a detailed flow chart of initialization processing (box 20) of FIG. 2.

The initial value of N for storing the number of image change points is set at 0 (box 20-1).

Further, variables t, t-1, t-2 are used as subscripts for address reference of various arrangements respectively indicating the current frame, a frame preceding the current frame by one frame, and a frame preceding the current frame by two frames.

As initial values, 0, 1 and 2 are supplied respectively to t, t-1 and t-2 (box 20-2).

Succeedingly, correlation coefficients D(t-1) and D(t-2) respectively of the frame preceding the current frame by one frame and the frame preceding the current frame by two frames are provided with 0 (box 20-3).

Figure 5:
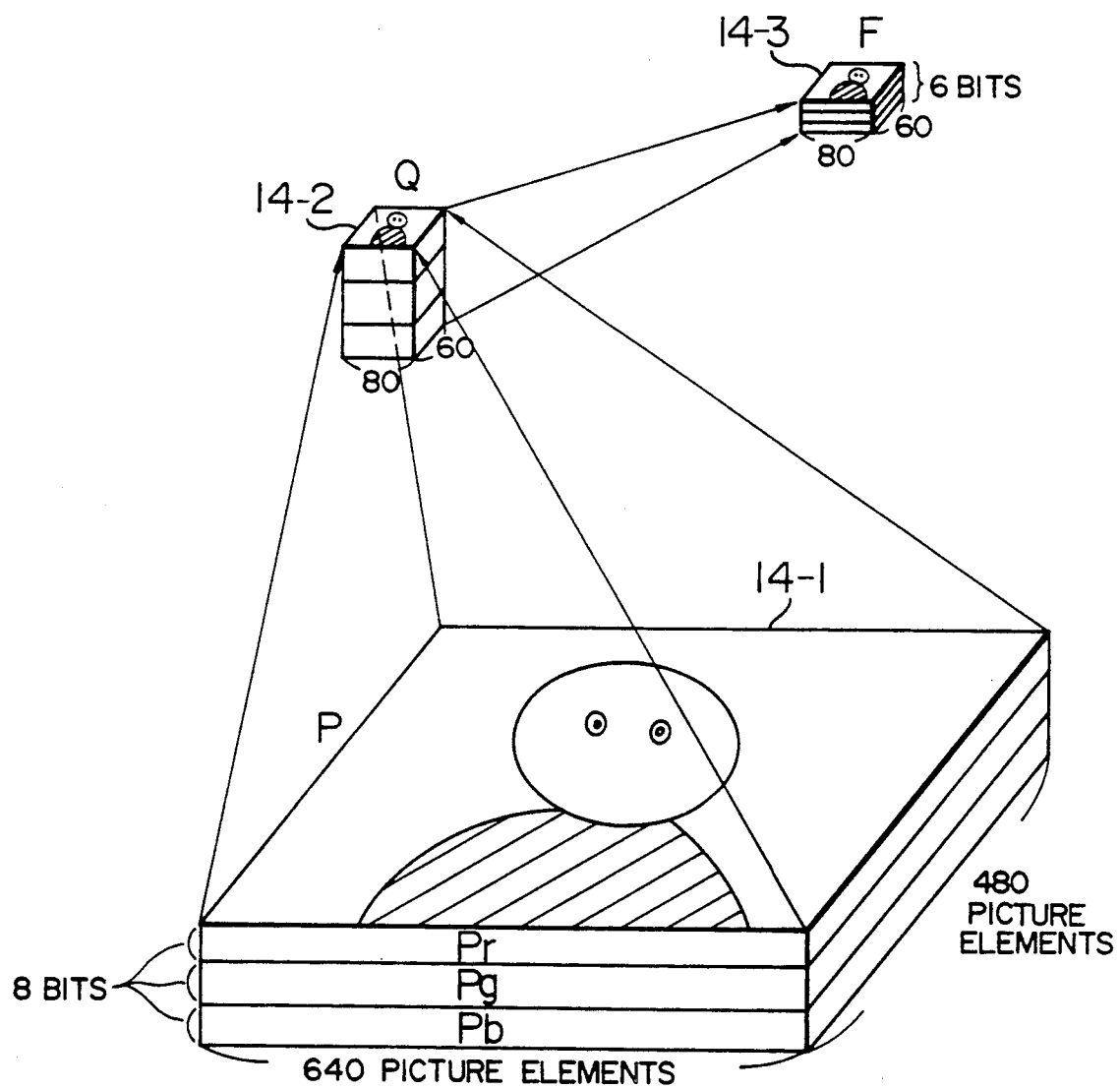
FIG. 5 is a diagram showing the concept of picture image decimation processing of FIG. 4.
Figure 6:
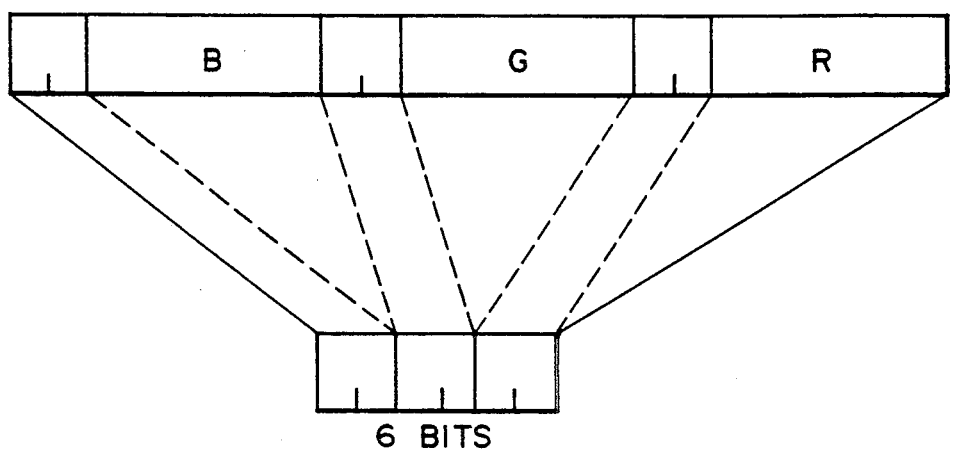
FIG. 6 is a diagram showing an example of color bit compression in FIG. 5.

FIG. 5 is a diagram showing the state of image decimation and compression of color picture element values in the frame memory of FIG. 1. FIG. 6 is a subsidiary explanation diagram for FIG. 5.

With reference to FIG. 5, numeral 14-1 denotes an input image P, 14-2 a color image Q after picture element decimation, and 14-3 a color code image F after complession of color identification bits. Longitudinal and lateral picture elements of the input image 14-1 are decimated respectively to $\frac{1}{8}$, and color identification bits compressed respectively to $\frac{1}{4}$. For convenience, reduction of picture elements and reduction of color bits are hereafter thus referred to as decimation and compression, respectively.

The color code image 14-3 after compression has information compressed to 1/256 as compared with the input image. Even if succeeding image processing is performed with respect to this compressed image, image change points can be detected more frequently than several frames per second even at an ordinary work station because of reduced information content.

As for compression of color bits, only two leading bits of 8 bits of each of B, G and R are taken out to form compressed bits as shown in FIG. 6.

FIG. 4 is a PAD diagram showing image decimation processing and color picture element value compression processing of FIG. 2. In FIG. 4, box 22-1 shows a concrete example of image decimation processing, and box 22-2 shows a concrete example of compression processing of color picture element values.

First of all, image decimation is performed by the following equations.

(i) Image decimation $$Qr(t, x, y) = Pr(t, m^*x, m^*y) \quad (1)$$
$$Qg(t, x, y) = Pg(t, m^*x, m^*y)$$
$$Qb(t, x, y) = Pb(t, m^*x, m^*y)$$

Here, P denotes an input color image, Q a color image after decimation (referred to as compressed image), t a frame number, m a decimation value, and * a multiplication symbol. Further, subscripts r, g and b represent components of three primary colors. In standard dynamic picture images, the image size is 640×480 picture elements. Here, m is a compression value. To be concrete, m is 8. The larger this value is, the larger the degree of compression becomes. When the value of m is large, however, there is also a possibility of lowering in detection performance. Therefore, the value of 8 has been determined by experimentally confirming that this value brings about good performance. Thereby, the amount of computation is reduced to 1/64 in the succeeding processing.

As for x and y addresses of images after compression in this case, x ranges from 1 to 80, whereas y ranges from 1 to 60. The frame number t of the above described equation (1) is stored into the variable TM. Further, in the present embodiment, it is not necessary to store sequentially images in the frame memory 14. What is needed for processing at the time point of processing of the frame number t is only one sheet of image at that time.

Block 22-1 of FIG. 4 shows concrete decimation processing. It is shown that the color image (compressed image) after decimation has coordinates obtained by multiplying x and y of the input color image P by the decimation value m.

(ii) Compression of color picture element values $$F(t, x, y) = Qr(t, x, y)*f + Qg(t, x, y)*f*R + Qb(t, x, y)*f*R*R \quad (2)$$

Here, F denotes a color code image after compression, f a compression coefficient of motion range of picture element values (f=1/64 in the example of FIG. 5), and R a motion range of each color component after compression (R=4 in the example of FIG. 5).

Further, the motion range of the color code image F is the cube of the motion range of R. Further, the compression coefficient f of the motion range is the same for respective components, but it may be set individually. Standard motion picture images have 24-bit colors, but they are herein compressed to 6-bit colors. (As shown in FIG. 6, two leading bits are taken out of 8 bits representing each color picture element value.)

In box 22-2 of FIG. 4, concrete compression processing of color picture element values is shown. Two high-order bits of each component are cut out and combined with bits of other components, resulting in a 6-bit composite signal that is to say, the term R in the color image Q after decimation processing is cut out by AND-ing data shifted by 6-bits and a numerical value 3. The term G is cut out by AND-ing data shifted by 12 bits and a numerical value 12. The term B is cut out by AND-ing data shifted by 18 bits and a numerical value 48. These terms thus cut out are OR-ed to be combined, resulting in 6 bits in total comprising three components each having 2 bits.

Figure 7:
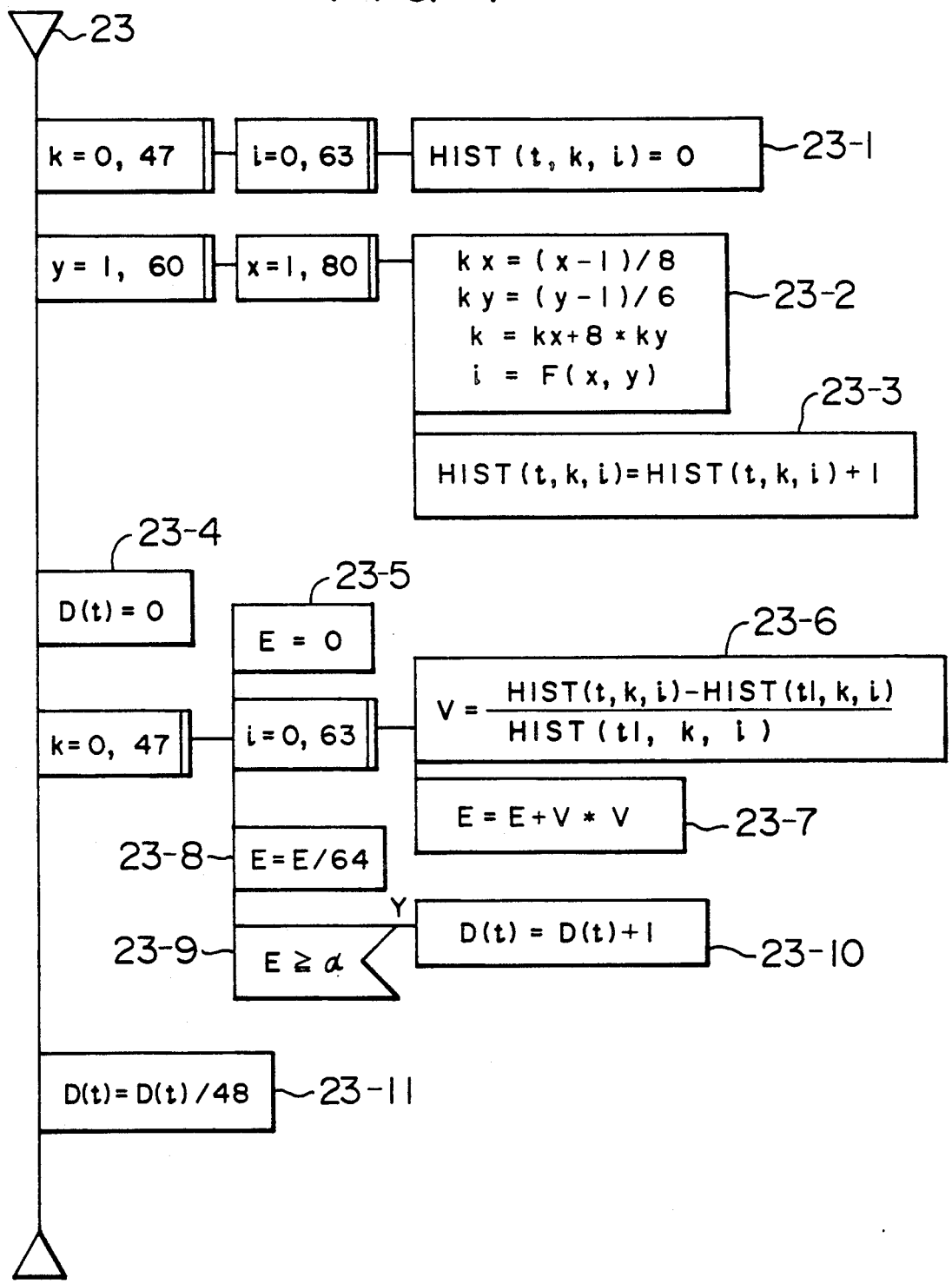
FIG. 7 is a PAD diagram showing the detailed procedure of correlation coefficient calculation in the same FIG. 2.

FIG. 7 is a PAD diagram of frame correlation coefficient calculation processing of FIG. 2.

Concrete calculations of correlation coefficient are performed by the following equations.

(i) Histogram calculation of each block $$G(t, k, x, y) = F(t, x + \Delta x*kx, y + \Delta y*ky) \quad (3)$$

-continued $$H(t, k, i) = \sum_{x=1}^{\Delta x} \sum_{y=1}^{\Delta y} 1 \ldots \text{if } (t, k, x, y) = i \quad (4)$$

Here, G denotes a block image, H a block histogram (i.e., a histogram counter value), F a color code image after compression, k a block serial number, kx a block number in the lateral direction, ky a block number in the longitudinal direction, Δx the number of picture elements in the latteral direction of the block, Δy the number of picture elements in the longitudinal direction of the block, and i a color code number. To be concrete, kx ranges from 0 to 7, and ky ranges from 0 to 5, whereas Δx=10 and Δy=10. The block serial number k ranges from 0 to 47. Further, i ranges from 0 to 63. The block serial number k, the block number kx in the lateral direction, and the block number ky in the longitudinal direction are related by k=kx+8*ky.

Figure 8A:
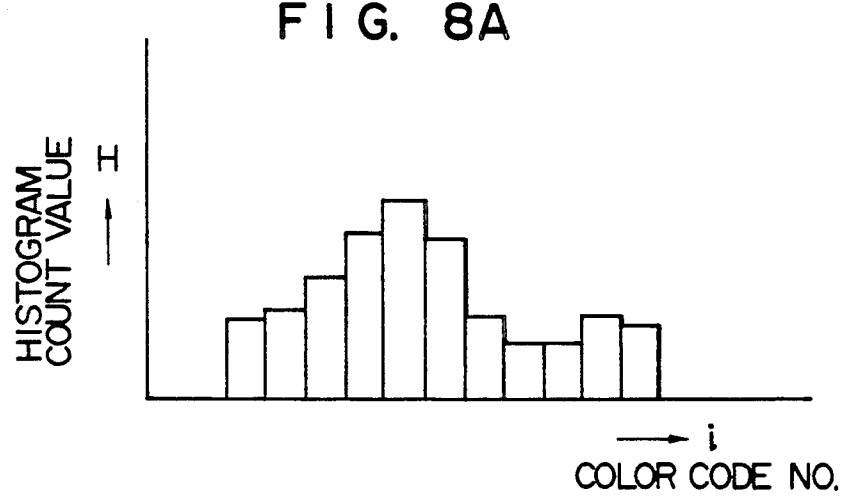
FIGS. 8A and 8B are diagrams showing the principle of histogram calculation in one divided frame picture image of the present invention.
Figure 8B:
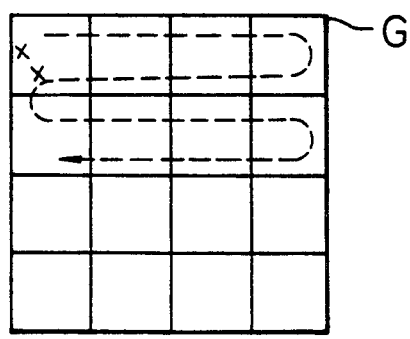

Equation (3) means that x and y of the block number k at time t of the block image G are obtained by cutting out time t included in the color code image F after compression, x+Δx*kx, and y+Δy*ky. Further, equation (4) means that contents of the histogram counter H are updated with respect to the block size Ax and Ay provided that the brightness in the place (x, y) in the block k is i. That is to say, each picture element (Δx, Δy) of a plurality of divided block images G is generally scanned as indicated by an arrow of FIG. 8B. If the color code is i, the value of the histogram counter H in that position is updated. That is to say, if the value is i in a graph having an axis of abscissas representing i and an axis of ordinates representing H as shown in FIG. 8A, the histogram counter value H in the place of i is updated. In this way, it is possible to know the histogram of the color code i of each block with respect to the brightness.

In FIG. 7, blocks 23-1, 23-2 and 23-3 represent calculation steps for deriving the histogram. In the block 23-1, a histogram storage area HIST is initialized to have 0.

In the block 23-2, indexing calculation of the block No. k and extraction processing of the color code i are performed. On the basis of the result, the pertinent histogram is updated by 1 in the block 23-3.

Since this processing is performed for each picture element of the image F only once, calculations are performed 80×60=4800 times. Unless images are decimated in the preprocessing, calculations must be performed 307,200 times which are equivalent to 64 times 4800.

(ii) Calculation of degree of histogram resemblance between blocks $$V(t, k, i) = (H(t, k, i) - H(t - 1, k, i))/H(t - 1, k, i) \quad (5)$$

$$E(t, k) = \frac{1}{Nc} \sum_{i=0}^{Nc-1} V^2(t, k, i) \quad (6)$$

Here, V denotes a normalized difference value of histogram, E a degree of histogram resemblance, and Nc a color code number. That is to say, V is a difference value obtained by individually normalizing respective elements of the histogram. Thereby, difference values of respective color codes have equal weights irrespective of the distribution shape of the histogram. Further, E is the mean square of V and E does not depend upon whether the color code number Nc is large or small.

This means that the value of E does not change essentially even if the image compression rate is changed suitably to a different value in preprocessing.

The color code number Nc has been reduced to 64 by preprocessing. In the above described equation (5) of the present embodiment, i is changed from 0 to 63 and k is changed from 0 to 47. In order to calculate for all cases, calculations must be made 3072 times in total. In the above described equation (6), k is changed only from 0 to 47, and hence calculations are made 48 times. Since i is changed from 0 to 63 in the equation (6), therefore, the processing time substantially becomes a value proportionate to 3072 times in the same way as the equation (5). If images are not compressed in the preprocessing, calculations are performed $2^{18} = 12,582,912$ times in equation (5) and (6). Further, in the present embodiment, the histogram H need only store histograms corresponding to two frames at most of the time t and time t-1. Therefore, the necessary capacity of the main memory 16 is reduced.

(iii) Calculation of interframe correlation coefficient $$D(t) = \frac{1}{Nk} \sum_{k=0}^{Nk-1} 1 \ldots \text{if } E(t, k) \geq \alpha \quad (7)$$

Here, D denotes a correlation coefficient, and Σ denotes the number of blocks which have changed. Since D is derived by dividing the number of blocks which have changed by the total number Nk of blocks, the proportion of an area which has changed with respect to the whole screen is approximately derived. Therefore, the precision can be improved by increasing Nk. Herein, Nk=48. Further, the parameter α is a threshold for determining whether a block has changed or not. Empirically, α is defined as α=0.5.

Figure 9A:
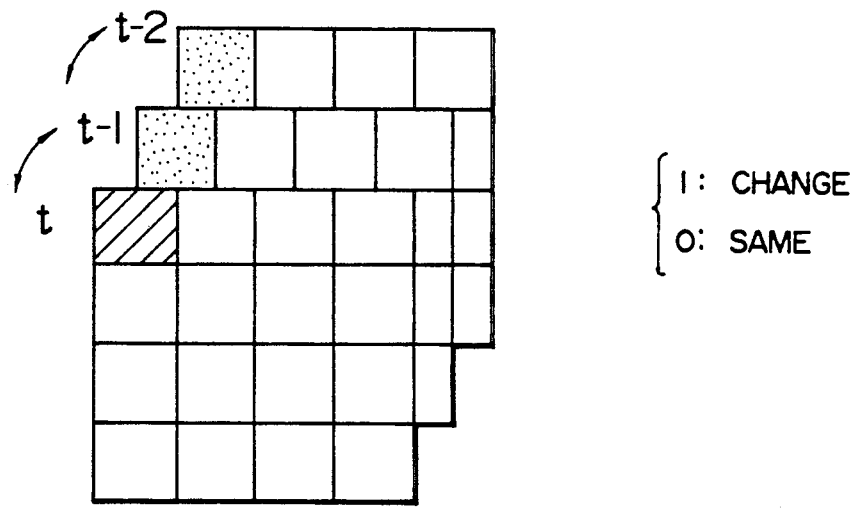
FIGS. 9A and 9B are diagrams for explaining the principle of an interframe correlation coefficient according to the present invention.
Figure 9B:
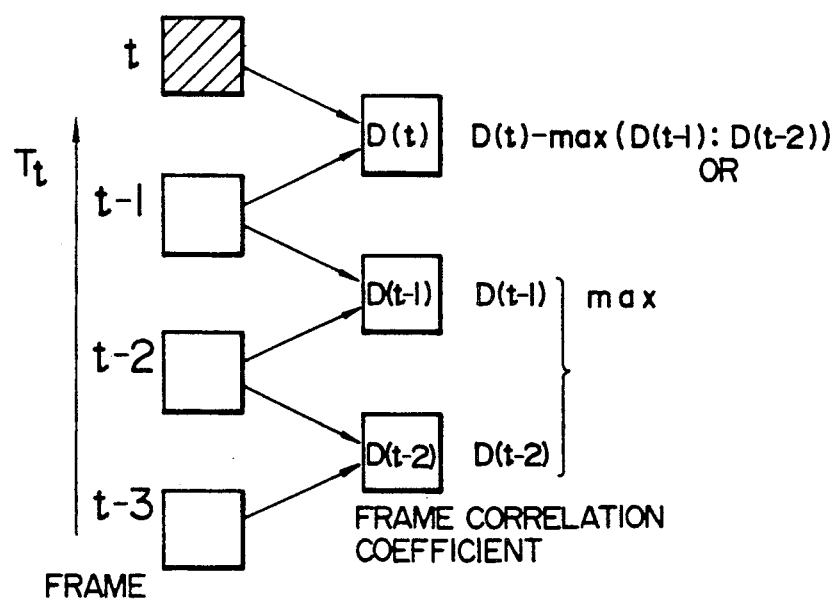

This is illustrated in FIG. 9A. For each of divided blocks, a change between a frame t and a frame t-1 proceding the frame t by one frame is checked. A change produces 1, whereas no change produces 0. In this way, the number of blocks which have changed is divided by the number of overall blocks. The same processing is then performed between the frame t-1 and a frame t-2 proceding the frame t-1 by one frame. In this way, changes of respective blocks are successively checked. Succeedingly, as shown in FIG. 9B, instead of the change of frame correlation coefficient as compared with that of the frame t-1 preceding the current frame by one frame, changes of frame correlation coefficients of t-1 and the frame t-2 preceding the current frame by two frames are compared, and the difference between the frame correlation coefficient and a larger change obtained by the above described comparison is derived, and the change rate of the frame correlation coefficient is obtained. Thereby, it is possible to prevent dispersion among frames.

Blocks 23-4 to 23-11 shown in FIG. 7 are calculation steps for deriving the correlation coefficient D(t).

First of all, the correlation coefficient D(t) is set at 0 in the block 23-4. The degree E of histogram resemblance of small blocks is derived in blocks 23-5, 23-6 and 23-7 and divided for respective color codes in block 23-8. When a fixed threshold is exceeded in decision block 23-9, the correlation coefficient D(t) is updated by one in block 23-10. The processing heretofore described is performed with respect to all of the small blocks. The resultant correlation coefficient D(t) is divided by the number of all blocks in block 23-11 to derive the final correlation coefficient D(t).

Figure 10:
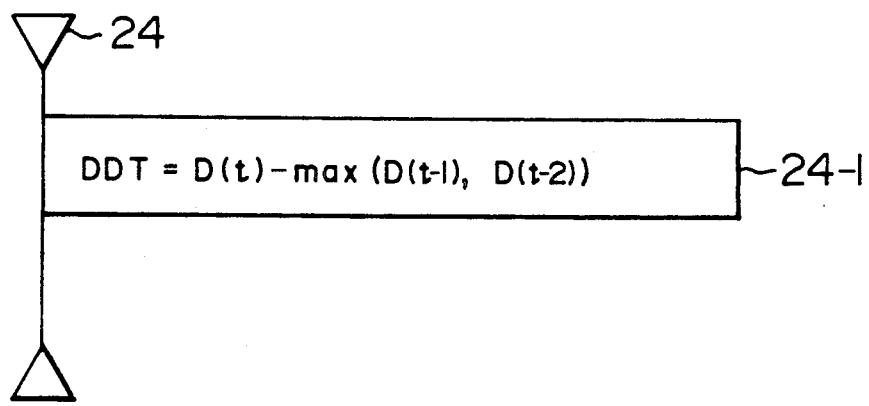
FIG. 10 is a PAD diagram showing details of a correlation coefficient change rate calculating method of the same FIG. 2.

FIG. 10 is a flow chart of correlation coefficient change rate calculation processing.

A concrete calculation method of correlation coefficient change rate will hereafter be described.

(i) Calculation of correlation coefficient change rate $$\frac{dD(t)}{dt} = D(t) - \max\{D(t-1), D(t-2)\} \quad (8)$$

The change rate is derived by the difference of correlation coefficient between frames. As a result of preliminary experiments, however, it has been found that there is a large dispersion among frames. As represented by block 24-1 of FIG. 10, therefore, a difference is derived with respect to a larger one of correlation coefficients of two immediately preceding frames. Of course, a difference may be derived with respect to the largest one among 3 frames including a further preceding frame. Considering that the motion picture image cut typically lasts for at least approximately one second (30 frames), a difference with respect to the largest value in the past 0.5 second (15 frames) may be defined as the change rate. It does not become a burden on the main memory 16 to store always approximately 15 correlation coefficients D. In case the picture image change in a motion picture image cut is intermittent with a period of several frames, an ordinary difference produces a large change rate. When the present invention is used, however, the value of change rate does not become large because the largest value of correlation coefficients is derived by further going back to past frames.

Figure 11:
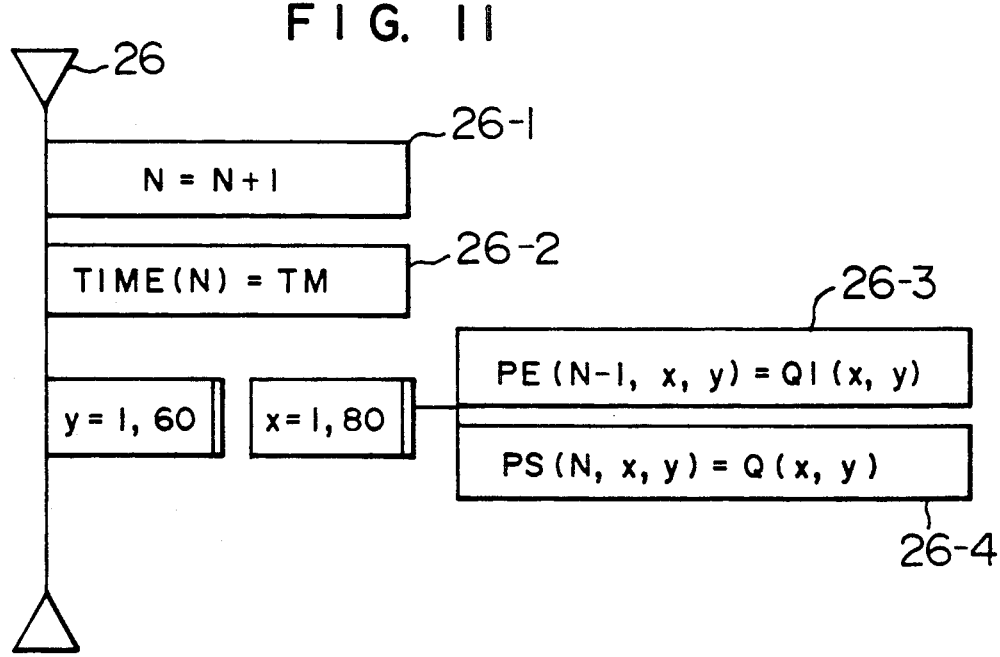
FIG. 11 is a PAD diagram showing details of index information producing processing of the same FIG. 2.

FIG. 11 is a flow chart of image change point registration processing.

Block 26 of FIG. 2 is index information producing processing of a motion picture image cut performed when a change point between cuts is determined. FIG. 11 shows its detailed operation.

First of all, the variable N is updated by 1 in block 26-1. In block 26-2, the value of variable TM storing the current time code is stored into arrangement TIME (N). Thereafter, an image Q1 preceding the change point between cuts by one is stored into an index image storage area PE in block 26-3. A current image Q is stored into an index image storage area PS in block 26-4. As a result, the start frame and the final alarm of a motion picture image cut are obtained as compressed images for indexing.

Figure 12:
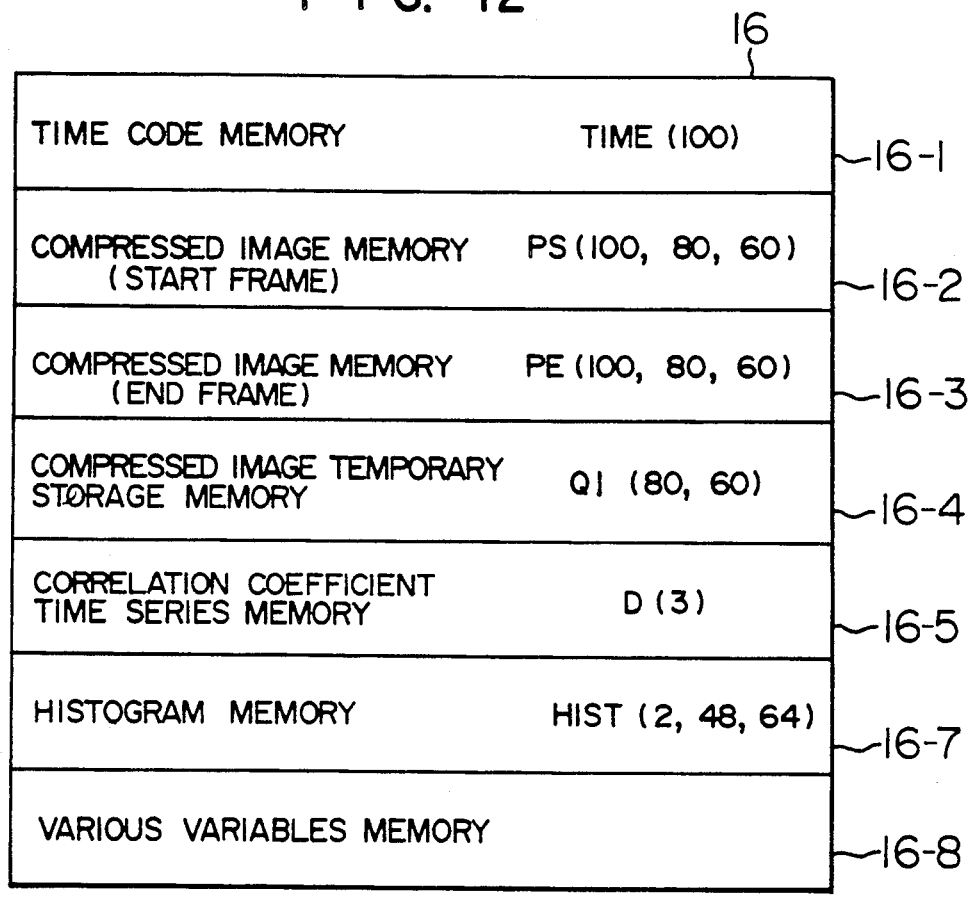
FIG. 12 is a diagram showing the structure of various arrangement data in a main memory included in the configuration of FIG. 1.

FIG. 12 is a diagram showing data structures of various arrangements included in the main memory of FIG. 1.

FIG. 12 shows a memory area 16 capable of storing 100 compressed images, which is divided into small areas, i.e., a time code memory arrangement TIME (100 images) 16-1, an area PS (100, 80, 60) 16-2 for storing index images of compressed image memory, an area PE (100, 80, 60) 16-3 for storing index images of compressed image memory, compressed image temporary storage memory Q1 (80, 60) 16-4, a correlation coefficient time series memory D (3) 16-5, a histogram memory HIST (2, 48, 64) 16-7, and a various variables memory 16-8.

As shown in FIG. 12, the present embodiment is so defined that up to 100 compressed images can be stacked in the main memory 16 as index images. When the number N of index images exceeds 100, however, they may be stored into the magnetic disk device 17 of the external memory.

Figure 13:
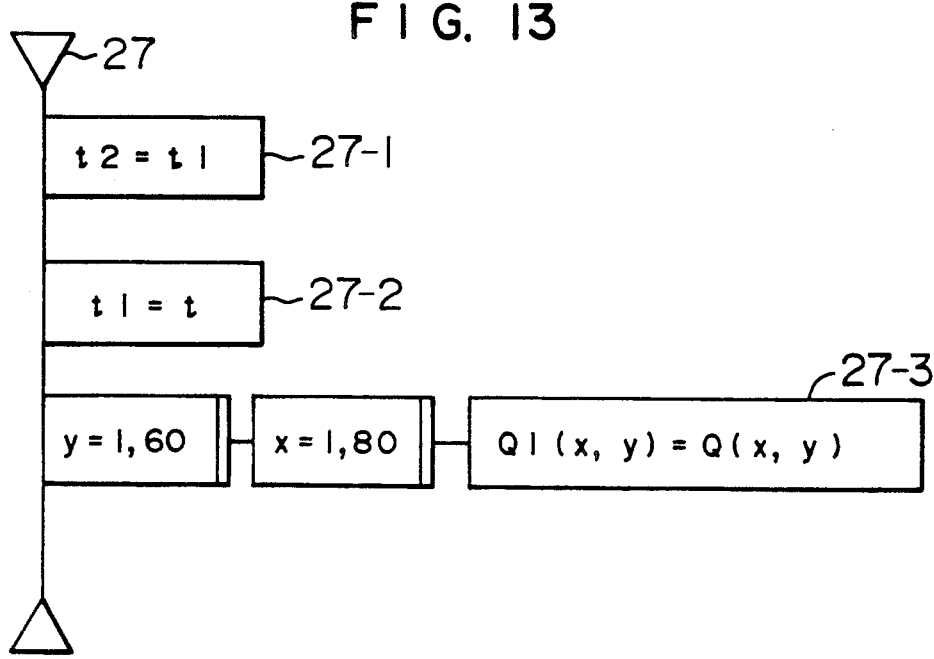
FIG. 13 is a PAD diagram showing details of frame update processing included in FIG. 2.

FIG. 13 is a flow chart of frame update processing.

First of all, variable t1 is substituted into variable t2 in block 27-1. Succeedingly, variable t is substituted into variable t1. As a result, subscripts for address reference of various arrangements indicating the current frame, a frame preceding the current frame by one frame, and a frame preceding the current frame by two frames are shifted. Without performing actual data transfer, the completely same effect as that of the case where various time series data are transferred is obtained. The image Q is then transferred to an image storage area Q1 preceding by one.

Figure 14A:
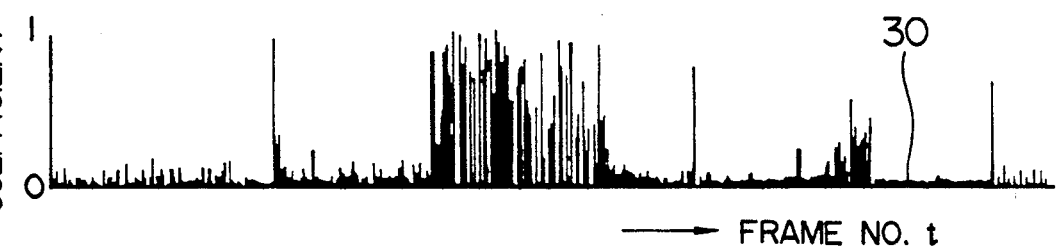
FIGS. 14A and 14B are time charts respectively showing the change of correlation coefficient and correlation coefficient change rate with time obtained by the present invention are applied.
Figure 14B:
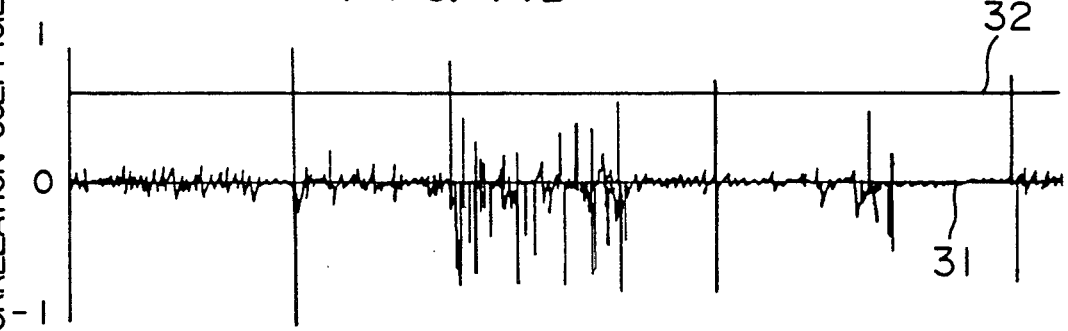
Figure 15A:
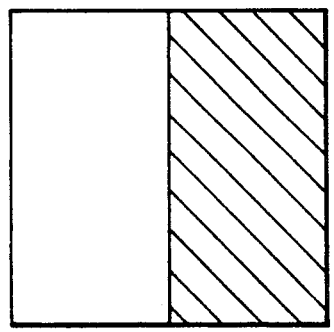
FIGS. 15A and 15B and FIGS. 16A and 16B respectively show examples of images having left and right halves of the screen as bright and dark portions, and characteristic diagrams in case where brightness histograms are obtained by taking one frame as the unit.
Figure 15B:
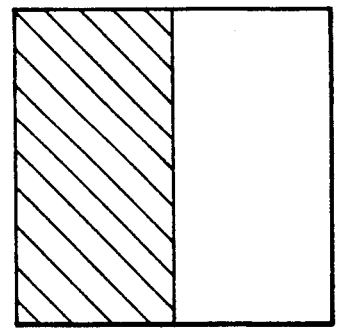
Figure 16A:
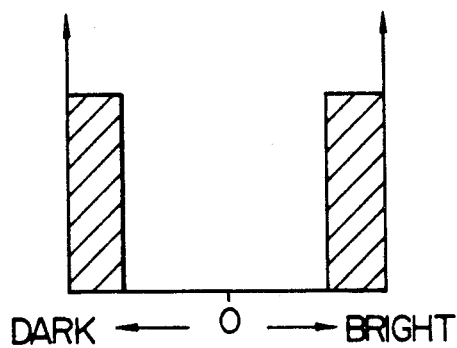
Figure 16B:
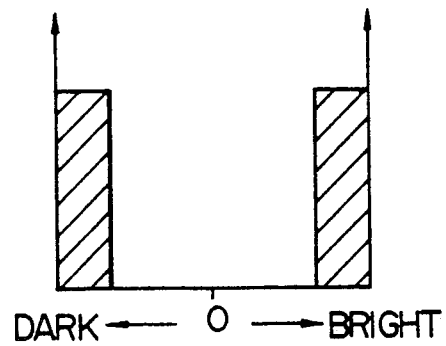

FIGS. 14A and 14B are time charts showing the change of correlation coefficient and correlation coefficient change rate with time obtained when the present embodiment is used.

As shown in FIG. 14A, the frame correlation coefficient 30 moves to the right as the No. is increased from frame No. 0. The central part having large values is a part having large correlation coefficients, i.e., a collection of images moving violently. All of them are not change points between motion picture image cuts. On the other hand, the correlation coefficient change rate 31 assumes values ranging from +1 to −1 around 0 as shown in FIG. 14B. Only when this correlation coefficient change rate 31 exceeds a fixed threshold 32, it is determined that a change point between motion picture image cuts has appeared.

When a conventional method of setting a threshold for the correlation coefficient 30 is used, false detection cannot be avoided in a frame having violent motions located at the central part of FIG. 14. When a method taking the change rate of FIG. 14B into consideration according to the present invention is used, however, false detection can be avoided.

In this way, the present invention brings about the following effects.

(a) Image decimation and compression of color picture element values are performed in preprocessing. As compared with input images, therefore, information is compressed to one 256-th. As a result, the amount of computation for detecting change points is reduced. Without using special hardware, a change point between motion picture image cuts can be detected at a practical speed even in an ordinary work station.

(b) The correlation coefficient is derived by dividing the screen into 48 small blocks, finding changed blocks on the basis of the degree of resemblance of color histogram between blocks, and dividing the sum total of these blocks which have changed by the number of all blocks. Unlike the method using histogram, therefore, lowering in detection sensitivity due to missing of information concerning an area is obviated.

(c) In order to finally determine an image change point which is a change point between motion picture image cuts, it is decided whether a difference value between a correlation coefficient and the largest correlation coefficient over several past frames has exceeded a fixed threshold. Even if image changes continue or are intermittent with short periods in the same motion picture image cut, therefore, false detection of an image change point is prevented.

As heretofore described, change points of motion picture images can be detected accurately without lowering the detection sensitivity and they can be detected at high speed even in an ordinary work station. The time code of change point information and compressed images thus derived can be effectively used as browsing information for automatically searching heads in video editing and rapidly referring to the whole video medium.

We claim:

1. A method for detecting change points between cuts from motion picture images including a plurality of consecutive images, said method comprising the steps of:
   inputting motion picture images in a time series by taking a frame as the unit, said motion picture images being the subject of detection of change points between cuts;
   producing a predetermined feature quantity including a color histogram possessed by image data of said motion picture images while taking a frame as the unit on the basis of said inputted motion picture images;
   producing a correlation coefficient concerning feature quantity between said produced feature quantity of a current frame and a feature quantity produced with respect to a frame immediately preceding the current frame;
   producing a change rate between said correlation coefficient and a correlation coefficient produced with respect to a frame preceding the current frame; and
   detecting a time point as a change point between cuts of said motion picture images, said change rate exceeding a predetermined allowable value at said time point.

2. A motion picture image change point detecting method according to claim 1, wherein said feature quantity includes luminance or color histogram of each of blocks obtained by dividing an image of each frame into a predetermined number of blocks.

3. A motion picture image change point detecting method according to claim 1, wherein said correlation coefficient is derived by dividing an image of each frame into a predetermined number of blocks, comparing said feature quantities between corresponding blocks of temporally consecutive preceding and succeeding frames, counting blocks in which the result of said comparison has indicated such a change as to exceed a predetermined value, and defining the number of blocks thus counted normalized by the number of blocks of the whole image included in one frame as said correlation coefficient.

4. A motion picture image change point detecting method according to claim 1, wherein said change rate is generated from a difference between a correlation value derived for the current frame and the largest one of correlation values derived with respect to a plurality of frames preceding said current frame.

5. A motion picture image change point detecting method according to claim 4, wherein said plurality of frames are arbitrarily selected out of frames ranging from said current frame to a frame preceding in time said current frame by 15 frames.

6. A motion picture image change point detecting method according to claim 1, wherein when said change point between cuts is detected, a time code identifying a frame detected as said change point between cuts and an image of a frame of said detected change point between cuts are generated as index information of a cut of motion picture images.

* * * * *